US012718019B2

(12) United States Patent
Watanabe

(10) Patent No.: US 12,718,019 B2
(45) Date of Patent: Aug. 25, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Kodai Watanabe, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 18/520,714

(22) Filed: Nov. 28, 2023

(65) Prior Publication Data

US 2024/0193363 A1 Jun. 13, 2024

(30) Foreign Application Priority Data

Dec. 13, 2022 (JP) ................................ 2022-198728

(51) Int. Cl.
*G06F 40/284* (2020.01)
*G06F 16/338* (2019.01)

(52) U.S. Cl.
CPC .......... *G06F 40/284* (2020.01); *G06F 16/338* (2019.01)

(58) Field of Classification Search
CPC .... G06F 40/284; G06F 16/338; G06F 40/279; G06F 40/295
See application file for complete search history.

(56) References Cited

U.S. PATENT DOCUMENTS

| | | | | |
|---|---|---|---|---|
| 11,222,165 | B1 * | 1/2022 | Ramos | G06F 40/279 |
| 2005/0105148 | A1 * | 5/2005 | Misawa | G06V 30/40 358/537 |
| 2010/0094831 | A1 * | 4/2010 | Hurst | G06F 40/295 707/E17.014 |
| 2020/0311352 | A1 * | 10/2020 | Miura | G06N 3/0442 |
| 2021/0056103 | A1 * | 2/2021 | Vellal | G06F 16/24578 |
| 2022/0188520 | A1 * | 6/2022 | Iso-Sipila | G06F 40/295 |
| 2023/0186028 | A1 * | 6/2023 | Higo | G06V 30/10 704/9 |
| 2023/0368015 | A1 * | 11/2023 | Wick | G06N 3/084 |

FOREIGN PATENT DOCUMENTS

JP 2021-064143 A 4/2021

* cited by examiner

*Primary Examiner* — Athar N Pasha

(74) *Attorney, Agent, or Firm* — Carter, DeLuca & Farrell LLP

(57) ABSTRACT

The accuracy of extracting a named entity representing a characteristic of a document is improved. An information processing apparatus that extracts the named entity from document data by using a natural language processing model obtains data of text from the document data, generates a token string by processing to breakdown the text into a token unit, generates input blocks by dividing the token string into blocks in a unit that can be processed by the natural language processing model, estimates the named entity for each input block by inputting each of the input blocks to the natural language processing model, determines whether each of the input blocks is valid to be used to extract the named entity representing the characteristic of the document data based on an estimation result, and outputs the named entity representing the characteristic of the document data based on the estimation result and a determination result.

10 Claims, 6 Drawing Sheets

| IDENTIFIER | DATE COUNTING VALUE | DOCUMENT TITLE COUNTING VALUE | ORGANIZATION NAME COUNTING VALUE | PERSONAL NAME COUNTING VALUE | DOCUMENT ID COUNTING VALUE | LEARNING LABEL |
|---|---|---|---|---|---|---|
| 0001 | 1 | 1 | 2 | 0 | 0 | 1 |
| 0002 | 0 | 0 | 0 | 0 | 0 | 0 |
| 0003 | 0 | 1 | 1 | 0 | 0 | 1 |

| IDENTIFIER | … | LEARNING LABEL | TF-IDF_1 | … | TF-IDF_256 | Top | Left | Bottom | Right |
|---|---|---|---|---|---|---|---|---|---|
| 0001 | … | 1 | 0.000 | … | 0.469 | 0.0 | 0.0 | 0.4 | 1.0 |
| 0002 | … | 0 | 0.000 | … | 0.687 | 0.4 | 0.0 | 0.7 | 1.0 |
| 0003 | … | 1 | 0.511 | … | 0.000 | 0.7 | 0.0 | 1.0 | 1.0 |

INFORMATION PROCESSING APPARATUS, INFORMATION PROCESSING METHOD, AND STORAGE MEDIUM

BACKGROUND

Field

The present disclosure relates to a technique of extracting a named entity from a document.

Description of the Related Art

There has been commonly known named entity recognition (NER) as a technique of extracting a character string (a named entity) defined in advance from a document. In the NER, with the defining of the character string such as "bill" and "delivery slip" in advance, it is possible to extract the corresponding character string from a text in a document. A natural language processing model as represented by Seq2Seq, Transformer, and the like that is mainstream in natural language processing estimates a named entity included in a text in a document by inputting a token string, which is obtained by dividing the text in the document into a unit called a token. Use of the above-described natural language processing model for the named entity extraction makes it possible to efficiently estimate the named entity included in the text in the document. On the other hand, since the number of the tokens that can be inputted at a time to the natural language processing model has an upper limit, in a case of estimating the named entity included in a long text, it has been necessary to divide the token string corresponding to the text into multiple blocks before inputting to the natural language processing model. In this regard, Japanese Patent Laid-Open No. 2021-64143 discloses a technique in which a document is divided into multiple blocks by a chapter, a section, or a paragraph in the document, and the named entity is extracted by each block.

In a case where the token string corresponding to each of multiple blocks is inputted to the natural language processing model by each block, the named entity is extracted by each inputted block. For this reason, some of the named entities extracted by each block may be improper as a named entity representing a characteristic of the document such as a document type, and as a result, the accuracy of extracting the named entity representing the characteristic of the document from the whole document may be deteriorated.

SUMMARY

An information processing apparatus according to the present disclosure that extracts a named entity from document data by using a natural language processing model, comprising: one or more hardware processors; and one or more memories storing one or more programs configured to be executed by the one or more hardware processors, the one or more programs including instructions for: obtaining data of text from the document data; generating a token string by performing processing to break down the text into a token unit; generating multiple input blocks by dividing the token string into blocks in a unit that can be processed by the natural language processing model; estimating the named entity for each input block by inputting each of the multiple input blocks to the natural language processing model; determining whether each of the multiple input blocks is valid as the input block used to extract the named entity representing a characteristic of the document data based on a result from the estimation; and outputting the named entity representing the characteristic of the document data based on the result from the estimation and a result from the determination.

Further features of the present invention will become apparent from the following description of exemplary embodiments with reference to the attached drawings.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

Embodiment 1

<Hardware Configuration>

Figure 1:
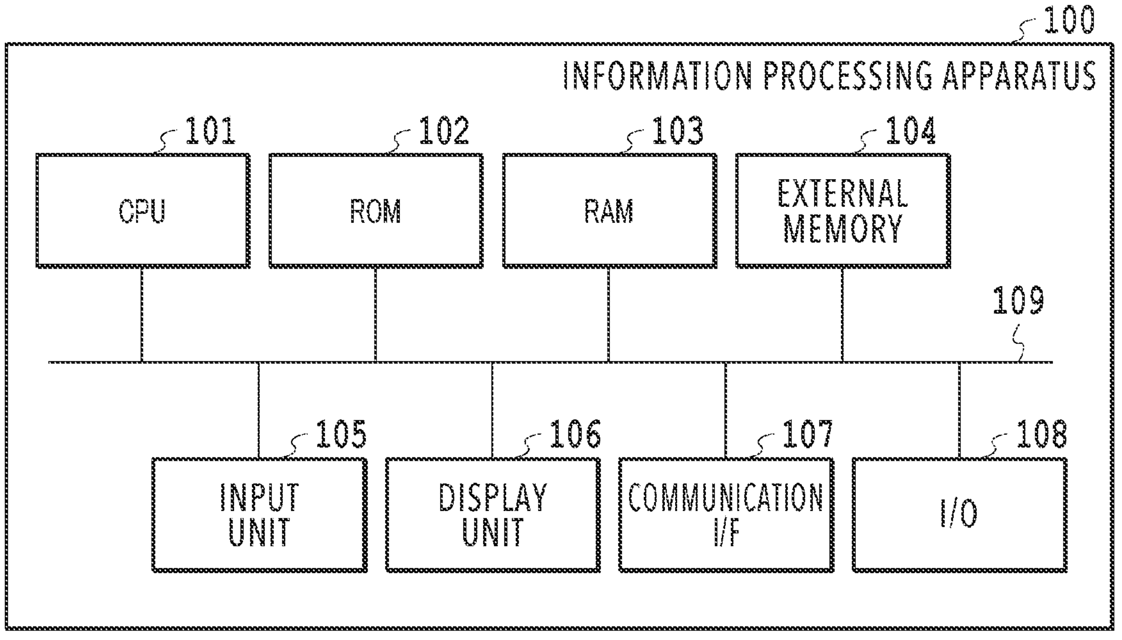
FIG. 1 is a block diagram illustrating an example of a hardware configuration of an information processing apparatus.

First, a hardware configuration of an information processing apparatus 100 according to each embodiment is described with reference to FIG. 1. FIG. 1 is a block diagram illustrating an example of a hardware configuration of the information processing apparatus 100 according to each embodiment. In FIG. 1, a CPU 101 controls various devices connected to a system bus 109. A ROM 102 stores a program of a basic input/output system (BIOS), a boot program, and the like. A RAM 103 is used as a main storage device of the CPU 101. An external memory 104 stores a program processed by the information processing apparatus 100.

An input unit 105 is formed of a touch panel, a keyboard, a mouse, a robot controller, or the like and is various devices used to input information and the like. A display unit 106 is formed of a liquid crystal monitor, a projector, an LED indicator, or the like and displays a user interface (UI) screen, a calculation result from the information processing apparatus 100, and the like according to an instruction from the CPU 101. The CPU 101 operates also as an input control unit that controls the input unit 105 and a display control unit that controls the display unit 106. In the present disclosure, description is given assuming that the input unit 105 and the display unit 106 exist inside the information processing apparatus 100; however, at least one of the input unit 105 and the display unit 106 may be a separate device outside the information processing apparatus 100. A communication I/F 107 establishes information communication with an external device through a network such as a LAN or the Internet according to the communication standard such as Ethernet (registered trademark), USB, or Wi-Fi (registered trademark). An I/O 108 is connected with a not-illustrated scanner, for example, and transmits and receives a command to control the scanner, data of a scanned image of a document (hereinafter, referred to as a "document image"), and the like.

<Functional Configuration>

Figure 2:
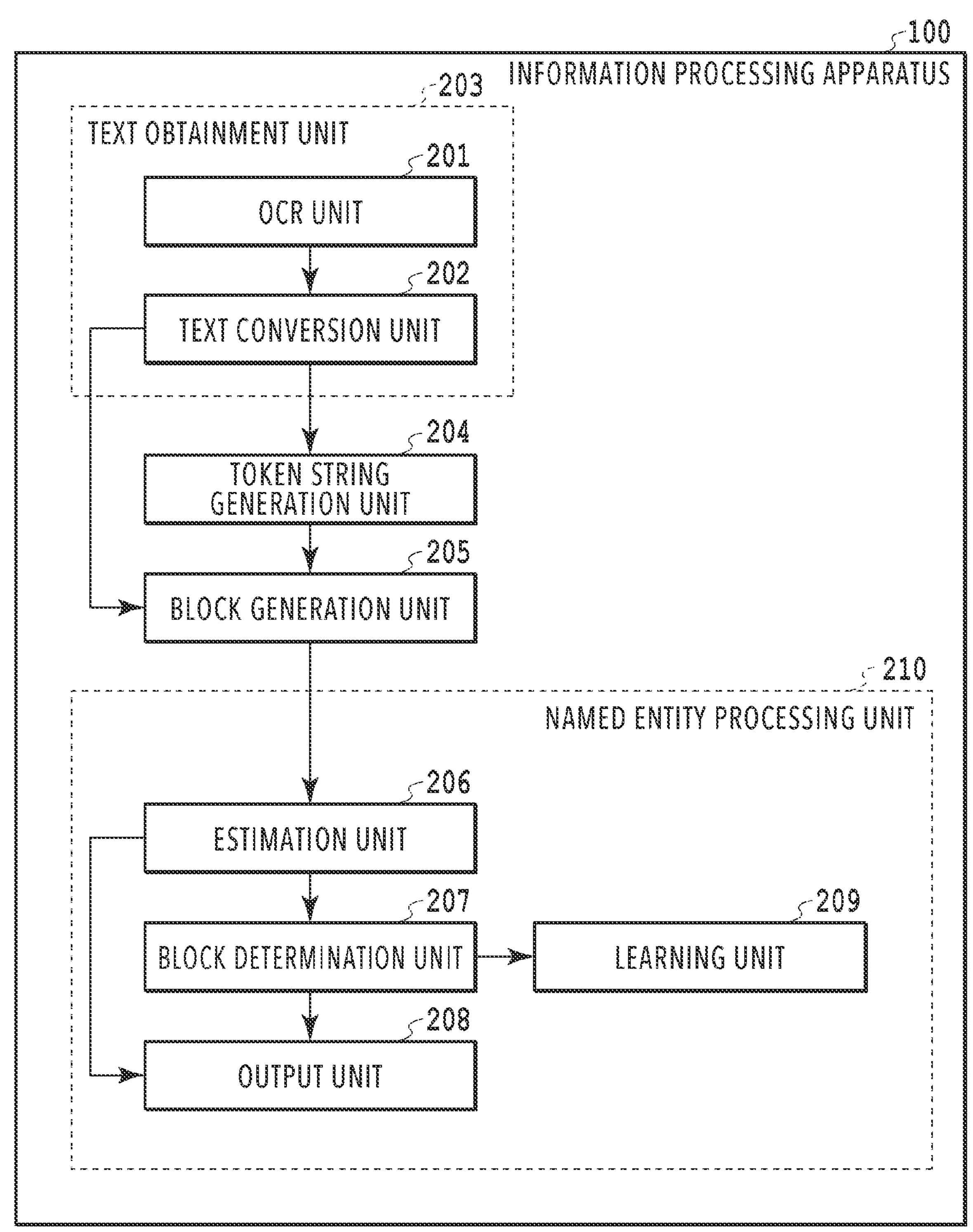
FIG. 2 is a block diagram illustrating an example of a functional configuration of the information processing apparatus according to Embodiment 1.

A functional configuration of the information processing apparatus 100 according to Embodiment 1 is described with reference to FIG. 2. FIG. 2 is a block diagram illustrating an example of a functional configuration of the information processing apparatus 100 according to Embodiment 1. The information processing apparatus 100 includes a text obtainment unit 203, a token string generation unit 204, a block generation unit 205, and a named entity processing unit 210. Processing by each unit included in the information processing apparatus 100 as a functional configuration is performed by software using the CPU 101 and the RAM 103.

The text obtainment unit 203 obtains data of the document (hereinafter, referred to as "document data") and obtains information on a character included in the document (hereinafter, referred to as "data of a text" or "text data"). For example, the text obtainment unit 203 includes an OCR unit 201 and a text conversion unit 202 and obtains the text data included in the document data as described below. Specifically, first, the OCR unit 201 obtains data of the document image (hereinafter, referred to as "document image data") as the document data and performs optical character recognition (OCR) on an image region corresponding to the character in the document image (hereinafter, referred to as a "character region"). In this way, the OCR unit 201 identifies the character or a character string existing in the document. Subsequently, the text conversion unit 202 connects the characters or the character strings identified by the OCR unit 201 to convert into the text data.

The text data is generated by, for example, scanning from left to right and from top to bottom based on a coordinate of each character region and combining the identified characters or character strings in sequence. Note that, the method of obtaining the text data is not limited to the method of OCR of the document image, and for example, in a case where an electronic file of the document includes the text data besides image data, the text obtainment unit 203 may obtain the text data. Additionally, for example, the text obtainment unit 203 may obtain the text data obtained by transcription from voice information.

The token string generation unit 204 performs morphemic analysis on the text data obtained by the text obtainment unit 203, provides a break between morphemes obtained by the morphemic analysis to break down into tokens, and generates a token string, which is an aggregation of the tokens. The token herein is the minimum unit of language information to be inputted to a natural language processing model. In this case, the unit of the token is the morpheme; however, the unit of the token is not limited thereto. The unit of the token may be a paragraph unit, a word unit, or a character unit, for example. The token string is generated by a tokenizer. The tokenizer is determined for each natural language processing model to be used. For example, in a case where bidirectional encoder representations from transformers (BERT) is used as the natural language processing model, the token string generation unit 204 can generate the token string by using a learned WordPiece tokenizer.

In the present embodiment, in a case where the number of the tokens of the token string obtained from the text data exceeds the upper limit of the number that can be inputted to the natural language processing model, the token string is divided into multiple blocks (hereinafter, referred to as "input blocks"), and multiple input blocks are generated. Additionally, each of the generated input blocks is inputted to the natural language processing model learned in advance, and the named entity is estimated. The natural language processing model learned in advance may include BERT, XLNet, and the like as an example. Note that, instead of using the natural language processing model as described above that is open to the public, a natural language processing model that is learned in advance from the beginning may be used. Moreover, it is not necessarily a natural language processing model having a transformer-based structure as long as it is an accurate natural language processing model learned in advance. For example, it may be a natural language processing model having a uniquely designed structure or may be a natural language processing model having a structure automatically designed by AUTOML or the like. Hereinafter, as an example, a mode in which BERT is used as the natural language processing model learned in advance is described.

The block generation unit 205 divides the token string generated by the token string generation unit 204 such that the number of the tokens is the predetermined number or less and generates the multiple input blocks. The predetermined number is an upper limit value of the number of the tokens that can be inputted to the natural language processing model (hereinafter, referred to as the "upper limit number of the tokens"). Hereinafter, description is given assuming that the upper limit number of the tokens that can be inputted to BERT is 512. Note that, in a case where the token string to be inputted to BERT includes "CLS" and "SEP", which are special tokens representing the beginning and the end of the token string, the valid number of the tokens is 512-2=510. Specifically, in a case where the number of the tokens included in the token string generated by the token string generation unit 204 is 1200, for example, the block generation unit 205 divides the tokens into three input blocks including 512 tokens, 512 tokens, and 176 tokens, respectively.

The named entity processing unit 210 includes an estimation unit 206, a block determination unit 207, an output unit 208, and a learning unit 209 and performs corresponding processing necessary to extract the named entity from the token string. Note that, the learning unit 209 is not an essential configuration, and the named entity processing unit 210 may not include the learning unit 209. Hereinafter, description is given assuming that the named entity processing unit 210 includes the learning unit 209.

The units included in the named entity processing unit 210 are described. The estimation unit 206 inputs each input block received from the block generation unit 205 to BERT and performs processing to estimate the named entity included in each input block. BERT used herein is a neural network model that is publicly known BERT to which a fully-connected layer to perform multiclass classification and a fully-connected layer to estimate a score representing a certainty of whether the named entity representing the characteristic of the document is included in the input block are added. Note that, the named entity representing the characteristic of the document is a named entity representing a document type such as a document title, for example. The named entity representing the characteristic of the document is not limited to the named entity representing the document type and may be a named entity representing a date such as a creation date or an issue date of the document, a named entity representing a personal name or an organization name such as a creator, an issuer, or a destination of the document, or the like.

Hereinafter, description is given while the fully-connected layer to perform the multiclass classification is referred to as a first fully-connected layer, and the fully-connected layer to estimate the score representing the certainty of whether the named entity representing the characteristic of the document is included in the input block (hereinafter, referred to as a "named entity score") is referred to as a second fully-connected layer. For example, the natural language processing model such as BERT includes information indicating a structure of the neural network, a weight parameter between nodes forming the neural network, and other various parameters. For example, BERT is stored in advance in the external memory 104, and the estimation unit 206 obtains BERT by reading from the external memory 104.

The estimation unit 206 converts each token included in the input block into a vector in the format that can be inputted to BERT after encoding and inputs the vector to an input layer of BERT. The estimation unit 206 performs the multiclass classification in the first fully-connected layer, estimates a named entity tag corresponding to each token included in the input block, and obtains the named entity tag corresponding to each token as an estimation result. Specifically, the first fully-connected layer estimates the named entity tag for each token and provides each token with the named entity tag of an inside-outside-beginning (IOB) 2 format or the like that is commonly used in the field of named entity extraction. For example, as the named entity tag of the IOB2 format, the first fully-connected layer provides a tag starting with "B-" to the first token out of the tokens included in the one or more named entities defined in advance and provides a tag starting with "I-" to the second and subsequent tokens. Additionally, a token that is not included in the named entity defined in advance is provided with "O" as the named entity tag.

For example, assuming that the text corresponding to the token string included in the input block is "ABC Co., Ltd.", and the token string includes two tokens corresponding to the two character strings that are "ABC" and "Co., Ltd.". In this case, the first fully-connected layer provides the first token of the corporate name with the named entity tag that is "B-ORG" and provides the subsequent token with the named entity tag that is "I-ORG". Thus, the estimation unit 206 can estimate the corporate name that is "ABC Co., Ltd." as the named entity. Additionally, for example, assuming that the text corresponding to the token string included in the input block is "June 21st, 2022", and the token string includes five tokens corresponding to "June", "21", "st", ",", and "2022". In this case, the first fully-connected layer provides the token corresponding to "June", which is the first token of the date, with the named entity tag that is "B-Date". Additionally, the first fully-connected layer provides each of the tokens corresponding to "21", "st", ",", and "2022", which follow "June", with the named entity tag that is "I-Date". Thus, the estimation unit 206 can estimate the date, "June 21st, 2022", as the named entity. The learning of BERT and the first fully-connected layer is performed in advance so as to be able to solve the above-described multiclass classification problem. In this way, the estimation unit 206 implements the estimation of the named entity.

Additionally, the estimation unit 206 estimates the named entity score of each input block by the second fully-connected layer. Specifically, the second fully-connected layer estimates the score (the named entity score) representing the certainty of whether each of multiple character strings representing the characteristic of the document, such as "bill", "delivery slip", and "receipt" determined in advance, is included in the input block as the named entity. The learning of BERT and the second fully-connected layer is performed in advance so as to be able to estimate the named entity score representing the certainty of whether the named entity corresponding to the character string that is determined in advance and represents the characteristic of the document, is included in the input block. In this way, the estimation unit 206 implements the estimation of the named entity score.

Based on an estimation result from the estimation unit 206, the block determination unit 207 determines whether each input block generated by the block generation unit 205 is valid as the input block used to extract the named entity representing the characteristic of the document data. Specifically, for example, the block determination unit 207 includes a vector generation unit that is not illustrated in FIG. 2. Based on the estimation result of the named entity of each input block by the first fully-connected layer of the estimation unit 206, the vector generation unit generates a characteristic amount vector in which a component value is the number of the named entities by each class classification in each input block.

For example, a case where a date "Date", a document title "TITLE", and a personal name "PERSON" are defined in advance as the class classification of the named entity is described. In this case, if the numbers of the named entities of each class classification by the first fully-connected layer in one input block are 2, 1, and 0, the vector generation unit generates (2, 1, 0) as the characteristic amount vector. Additionally, if no named entity corresponding to the above-described class classification defined in advance is estimated in the input block by the first fully-connected layer, the numbers of the named entities of each class classification are 0, 0, and 0, respectively, and the characteristic amount vector is (0, 0, 0). This is because the reason for using the numbers of the named entities of each class classification in the input block to determine whether the input block is valid for the extraction of the named entity representing the characteristic of the document data is because it is considered that there is a correlation between the frequency of appearance of the named entity and the validity of the extraction of the named entity.

The block determination unit 207 determines whether the input block corresponding to the characteristic amount vector is valid as the input block used to extract the named entity representing the characteristic of the document data by inputting the characteristic amount vector generated by the vector generation unit to a determination model. For example, the determination model is a learned model generated in advance by machine learning and the like and infers with binary whether the input block corresponding to the inputted characteristic amount vector is valid as the input block used to extract the named entity representing the characteristic of the document data. For example, in a case where it is inferred that the input block is valid as the input block used to extract the named entity representing the characteristic of the document data, the determination model outputs 1 as an inference result. On the other hand, in a case where it is inferred that the input block is invalid as the input block used to extract the named entity representing the characteristic of the document data, the determination model outputs 0 as the inference result. For example, the determination model can be implemented by learning by a machine learning algorithm of a decision tree model such as random forest in which the characteristic amount vector is inputted and the binary classification is outputted. For example, the determination model includes information indicating a graph structure of the decision tree, a parameter corresponding to each explanatory variable, and the like. For example, the determination model is stored in advance in the external memory 104, and the estimation unit 206 obtains the determination model from the external memory 104 by reading.

The method of determining whether the input block is valid as the input block used to extract the named entity representing the characteristic of the document data is not limited to that described above. For example, the block determination unit 207 may perform the above-described determination by using correspondence information obtained by associating in advance information indicating whether the input block is valid as the input block used to extract the named entity representing the characteristic of the document data and the characteristic amount vector with each other. In this case, the block determination unit 207 compares the characteristic amount vector generated by the vector generation unit with the above-described correspondence information and determines whether the input block corresponding to the characteristic amount vector is valid as the input block used to extract the named entity representing the characteristic of the document data.

Additionally, for example, the block determination unit 207 may determine whether the input block is valid as the input block used to extract the named entity representing the characteristic of the document data by using the named entity score estimated by the second fully-connected layer. In this case, for example, the block determination unit 207 determines that the input block corresponding to the named entity score that is equal to or greater than a threshold determined in advance is valid as the input block used to extract the named entity representing the characteristic of the document data. On the other hand, the block determination unit 207 determines that the input block corresponding to the named entity score that is smaller than the threshold is invalid as the input block used to extract the named entity representing the characteristic of the document data.

Based on the estimation result from the estimation unit 206 and a determination result from the block determination unit 207, the output unit 208 outputs the named entity representing the characteristic of the document data. Specifically, the output unit 208 determines the named entity representing the characteristic of the document data from one or more named entities estimated by the estimation unit 206 by using the named entity score estimated by the second fully-connected layer and the determination result from the block determination unit 207 and outputs the determined named entity. To be more specific, the output unit 208 determines the named entity to output by using only the named entity score corresponding to each of the one or more input blocks that are determined by the block determination unit 207 to be valid to be used to extract the named entity representing the characteristic of the document data. That is, in the determination of the named entity to output, the output unit 208 does not use the named entity score corresponding to the input block determined by the block determination unit 207 to be invalid as the input block used to extract the named entity representing the characteristic of the document data.

For example, the output unit 208 obtains the named entity score of the token string corresponding to the whole document by combining the named entity scores corresponding to the one or more input blocks that are determined by the block determination unit 207 to be valid to be used to extract the named entity representing the characteristic of the document data. Hereinafter, description is given while the combined named entity scores of the token string corresponding to the whole document are referred to as a combined score. Specifically, the output unit 208 obtains the combined score by calculating an average value of the named entity scores corresponding to the one or more input blocks determined to be valid for each character string that is determined in advance and represents the characteristic of the document. The method of obtaining the combined score is not limited to that described above. For example, the output unit 208 may obtain the combined score by using a statistics value such as the maximum value or a median value of the named entity scores corresponding to the one or more input blocks determined to be valid for each character string that is determined in advance and represents the characteristic of the document. The output unit 208 compares the score of each character string that is determined in advance and represents the characteristic of the document in the combined score with a threshold determined in advance, and for example, outputs the named entity corresponding to the character string with the score equal to or greater than the threshold as the named entity representing the characteristic of the document.

The learning unit 209 performs additional machine learning on the determination model. For example, the learning unit 209 performs the additional machine learning on the determination model by supervised learning. Specifically, the learning unit 209 uses the characteristic vector generated by the vector generation unit as the learning data and compares a determination result outputted by the determination model with training data corresponding to the characteristic vector. In this way, the learning unit 209 changes the parameter of the determination model so as to reduce a loss of the determination result with respect to the training data. Details of the learning data and the training data used in the additional learning of the determination model are described later.

<Processing Flow>

Figure 3:
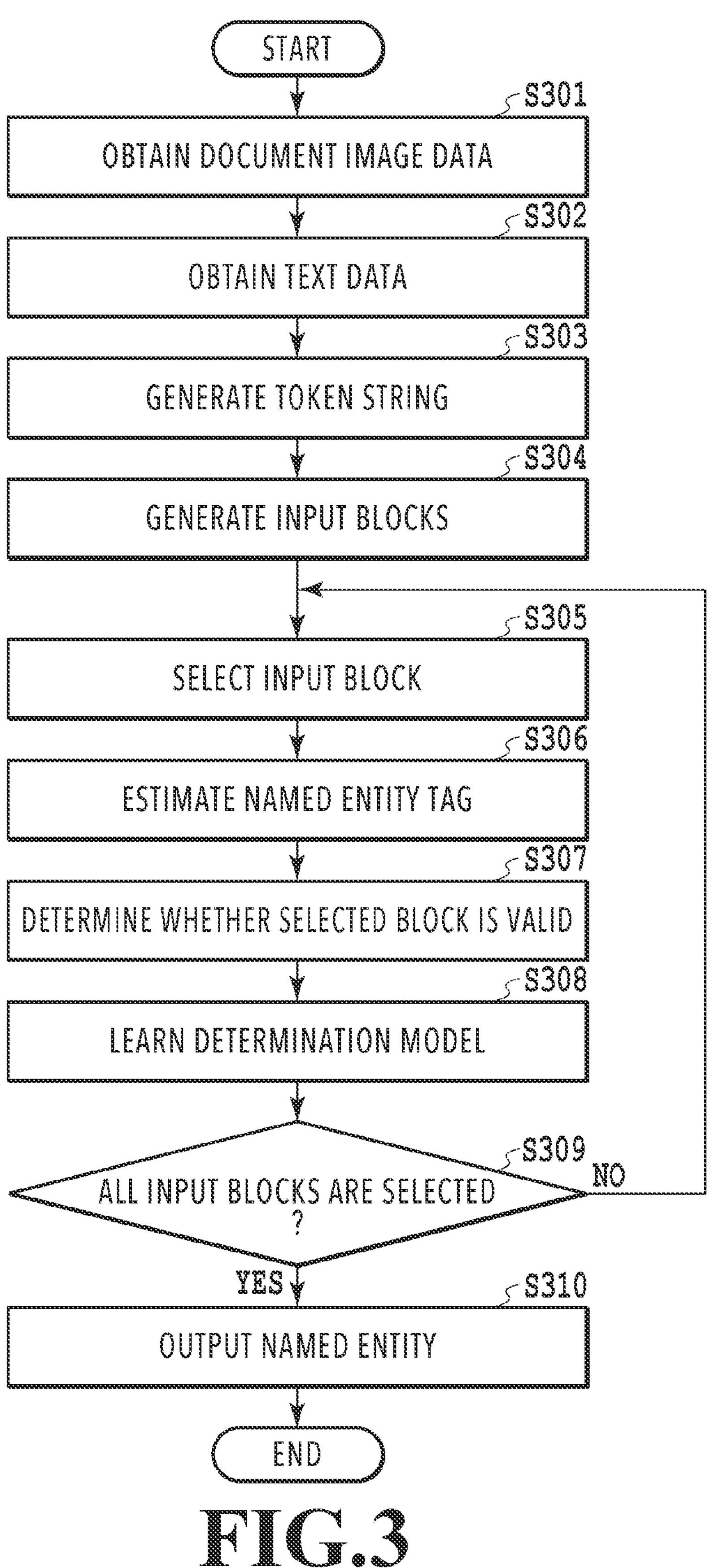
FIG. 3 is a flowchart illustrating an example of a processing flow of the information processing apparatus according to Embodiment 1.

An operation of the information processing apparatus 100 according to Embodiment 1 is described with reference to FIG. 3. FIG. 3 is a flowchart illustrating an example of a processing flow of the information processing apparatus 100 according to Embodiment 1. Note that, a sign "S" in the descriptions below means a step. First, in S301, the OCR unit 201 obtains the document image data and identifies the characters or the character strings included in the document image. Next, in S302, the text conversion unit 202 connects the characters or the character strings identified in S301 and converts into the text data. Next, in S303, the token string generation unit 204 generates the token string corresponding to the text data converted in S302. Next, in S304, the block generation unit 205 divides the token string generated in S303 and generates the multiple input blocks. Next, in S305, the estimation unit 206 selects an arbitrary input block from the multiple input blocks generated in S304. The selected input block is inputted to the natural language processing model such as BERT including the first fully-connected layer and the second fully-connected layer.

Next, in S306, the estimation unit 206 estimates the named entity tag corresponding to each token included in the input block selected in S305 and the named entity score of the input block. In this way, the estimation unit 206 obtains the information on the named entity tag and the named entity score corresponding to the input block as the estimation result. Next, in S307, the block determination unit 207 determines whether the input block selected in S305 is valid as the input block used to extract the named entity representing the characteristic of the document data. Specifically, in S307, first, the block determination unit 207 generates the characteristic amount vector. In S307, subsequently, the block determination unit 207 determines whether the input block selected in S305 is valid as the input block used to extract the named entity representing the characteristic of the document data by using the generated characteristic amount vector and obtains the determination result. Next, in S308, the learning unit 209 performs the additional machine learning on the determination model. Next, in S309, for example, the estimation unit 206 determines whether all the input blocks generated in S304 are selected in S305.

If it is determined in S309 that at least one of the input blocks is not selected, the information processing apparatus 100 returns to S305 and repeatedly executes the processing from S305 to S309 until it is determined in S309 that all the input blocks are selected. If it is determined in S309 that all the input blocks are selected, in S310, the output unit 208 outputs the named entity representing the characteristic of the document data based on the estimation result from S306 and the determination result from S307 of each input block. For example, the named entity outputted in S310 is used as a part of a file name of the document data such as the document image data or for sorting of the document data. After S310, the information processing apparatus 100 ends the flowchart illustrated in FIG. 3.

<Output of Named Entity>

Figure 4:
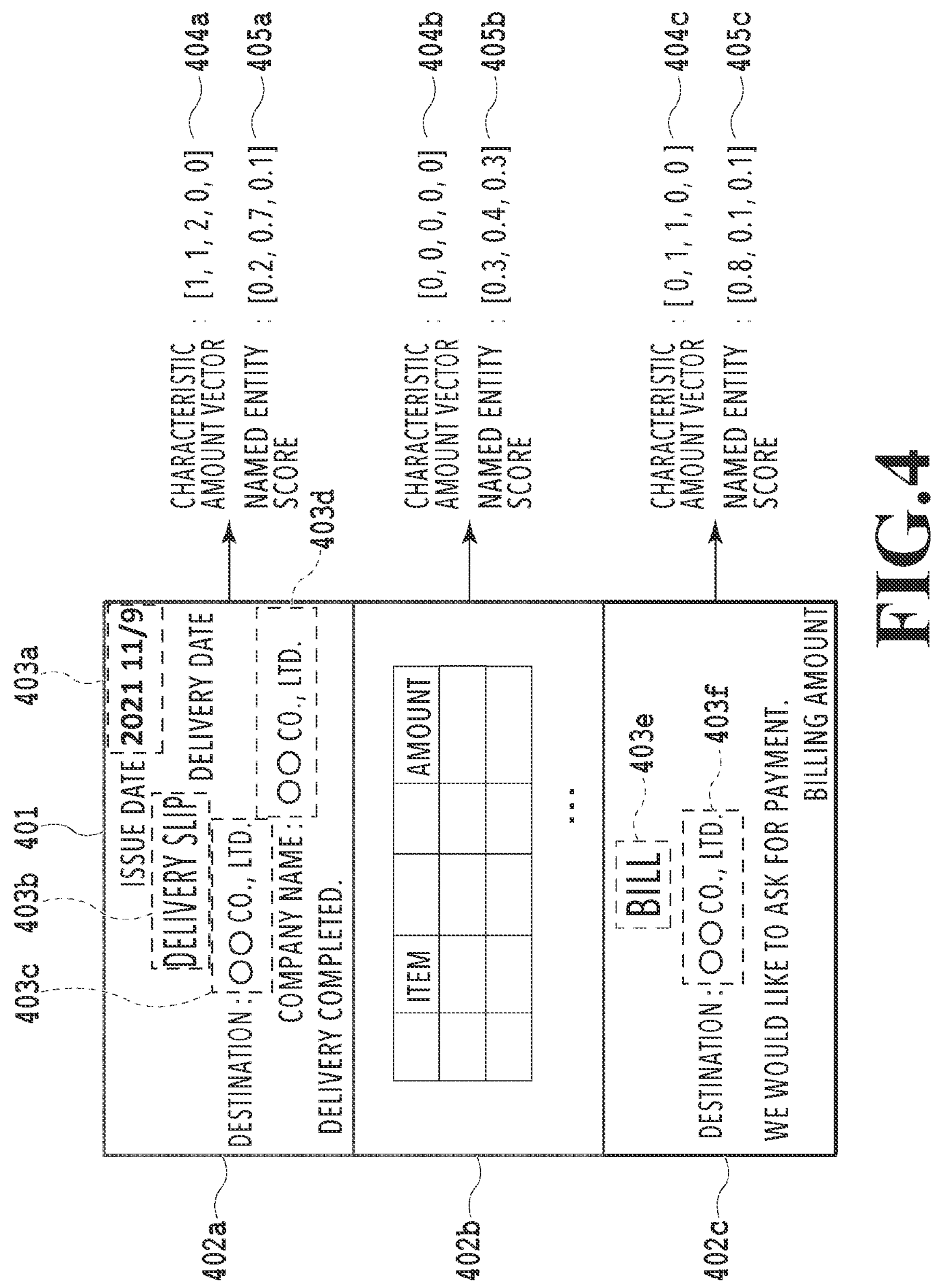
FIG. 4 is an explanatory diagram describing an example of processing by the information processing apparatus according to Embodiment 1.

A series of processing according to outputting of the named entity representing the characteristic of the document data by the information processing apparatus 100 is described with reference to FIG. 4. FIG. 4 is an explanatory diagram describing an example of a series of processing to reach the outputting of the named entity representing the characteristic of the document data in the information processing apparatus 100 according to Embodiment 1. A document image 401 is a scanned image of a paper that is a single document in which a delivery slip and a bill are combined. Data that is "issue date 11/9 2021 . . . " is obtained by OCR on the document image 401 as the text data of the connected characters or character strings included in the document image 401. The text data is divided into multiple tokens, and the token string that is "issue|date|11|/|9|2021| . . . " is obtained. In this case, "|" represents a break between the tokens. The token string is divided into the multiple input blocks that can be inputted to the natural language processing model. As an example, FIG. 4 illustrates a state in which the token string is divided into three input blocks 402*a*, 402*b*, and 402*c*. The named entity tag corresponding to the token included in the input block and the named entity score corresponding to the input block are estimated for each input block.

Hereinafter, as an example, description is given assuming that there are five types of the named entity tags to be estimated, which are "date", "document title", "organization name", "personal name", and "document ID". Additionally, description is given assuming that the named entity score represents the certainty of whether each of three types of the character strings, which are "bill", "delivery slip", and "contract", is included in the input block as the named entity for each character string.

Characteristic amount vectors 404*a*, 404*b*, and 404*c* are the characteristic amount vectors corresponding to the input blocks 402*a*, 402*b*, and 402*c*, respectively. In this case, as an example, the characteristic amount vectors 404*a*, 404*b*, and 404*c* illustrated in FIG. 4 each include five components, which are (i, j, k, l, m). A value of i, which is the first (leftmost) component, corresponds to the number of the named entities with the named entity tag that is estimated as "date" in the corresponding input block. Likewise, values of j, k, l, and m correspond to the numbers of the named entities with the named entity tags that are estimated as "document title", "organization name", "personal name", and "document ID", respectively, in the corresponding input block. For example, from the input block 402*c* illustrated in FIG. 4, as an example, a character string 403*e*, which is "bill" with the named entity tag corresponding to "document title", is estimated as the named entity. Likewise, from the input block 402*c*, as an example, a character string 403*f*, which is "○○ Co., Ltd." with the named entity tag corresponding to "organization name", is estimated as the named entity. Therefore, the characteristic amount vector 404*c* corresponding to the input block 402*c* is (0, 1, 1, 0, 0).

From the input block 402*a*, a character string 403*b*, which is "delivery slip" with the named entity tag corresponding to "document title", a character string 403*a* with the named entity tag corresponding to "date", and character strings 403*c* and 403*d* with the named entity tag corresponding to "organization name" are estimated as the named entity. Therefore, the characteristic amount vector 404*a* corresponding to the input block 402*a* is (1, 1, 2, 0, 0). On the other hand, from the input block 402*b*, the named entity with the named entity tag corresponding to "date", "document title", "organization name", "personal name", or "document ID" is not estimated. Therefore, the characteristic amount vector 404*b* corresponding to the input block 402*b* is (0, 0, 0, 0, 0).

Named entity scores 405*a*, 405*b*, and 405*c* are the named entity scores corresponding to the input blocks 402*a*, 402*b*, and 402*c*, respectively. In this case, as an example, the named entity scores 405*a*, 405*b*, and 405*c* illustrated in FIG. 4 are each expressed by numerical values of three components that are (x, y, z). In this case, each of x, y, and z is a real number equal to or greater than 0 and equal to or smaller than 1, for example. The values of x, y, and z are not limited to the real number equal to or greater than 0 and equal to or smaller than 1 and may be an integer or the like that is equal to or greater than 0 and equal to or smaller than 100, for example. The first (leftmost) component, x, represents the certainty of whether the character string that is "bill" is included in the input block as the named entity. Likewise, the second (middle) component, y, represents the certainty of whether the character string that is "delivery slip" is included in the input block as the named entity, and the third (rightmost) component, z, represents the certainty of whether the character string that is "contract" is included in the input block as the named entity, respectively.

That is, the named entity score 405*a* indicates that the certainties of whether the character strings, "bill", "delivery slip", and "contract", are included in the input block 402*a* as the named entity are 0.2, 0.7, and 0.1, respectively. Additionally, the named entity score 405*b* indicates that the certainties of whether the character strings, "bill", "delivery slip", and "contract", are included in the input block 402*b* as the named entity are 0.3, 0.4, and 0.3, respectively. Likewise, the named entity score 405*c* indicates that the certainties of whether the character strings, "bill", "delivery slip", and "contract", are included in the input block 402*c* as the named entity are 0.8, 0.1, and 0.1, respectively.

The information processing apparatus 100 determines whether each of the input blocks 402*a*, 402*b*, and 402*c* is valid as the input block used to extract the named entity representing the characteristic of the document data by using each of the characteristic amount vectors 404*a*, 404*b*, and 404*c*. The determination is performed by inputting the characteristic vector to the learned model such as random forest that is learned as the determination model for determining whether the input block is valid as the input block used to extract the named entity representing the characteristic of the document data. Hereinafter, description is given assuming that the input blocks 402*a* and 402*c* are determined to be valid as the input block used to extract the named entity representing the characteristic of the document data. Additionally, description is given assuming that the input block 402*b* is determined to be invalid as the input block used to extract the named entity representing the characteristic of the document data.

The information processing apparatus 100 generates the combined score by using the named entity scores 405*a* and 405*c* corresponding to the input blocks 402*a* and 402*c* that are determined to be valid as the input block used to extract the named entity representing the characteristic of the document data. Specifically, for example, the combined score is generated by selecting the maximum value of each component out of the component values of the named entity scores 405*a* and 405*c* as the component value of the combined score. That is, in a case of the named entity scores 405*a* and 405*c* illustrated in FIG. 4, the combined score is (0.8, 0.7, 0.1). Additionally, the information processing apparatus 100 performs threshold processing on the generated combined score and converts the component value of the combined score into a binary, which is 0 or 1. For example, in a case where the threshold is 0.7, the combined score after the threshold processing is (1, 1, 0). Finally, the information processing apparatus 100 outputs the character string corresponding to the component in which the component value of the combined score after the threshold processing is 1 as the named entity representing the characteristic of the document data. Specifically, in the present embodiment, "bill" and "delivery slip" are outputted as the named entity representing the characteristic of the document data, and for example, a file name that is "bill and delivery slip" is provided to the document data such as the document image data.

According to the information processing apparatus 100 formed as described above, it is possible to improve the accuracy of extracting the named entity representing the characteristic of the document. Particularly, even in a case where the number of the tokens included in the token string corresponding to the document exceeds the upper limit value (the upper limit number of the tokens) that can be inputted to the natural language processing model, it is still possible to improve the accuracy of extracting the named entity representing the characteristic of the document.

<Additional Learning of Determination Model>

Figure 5:
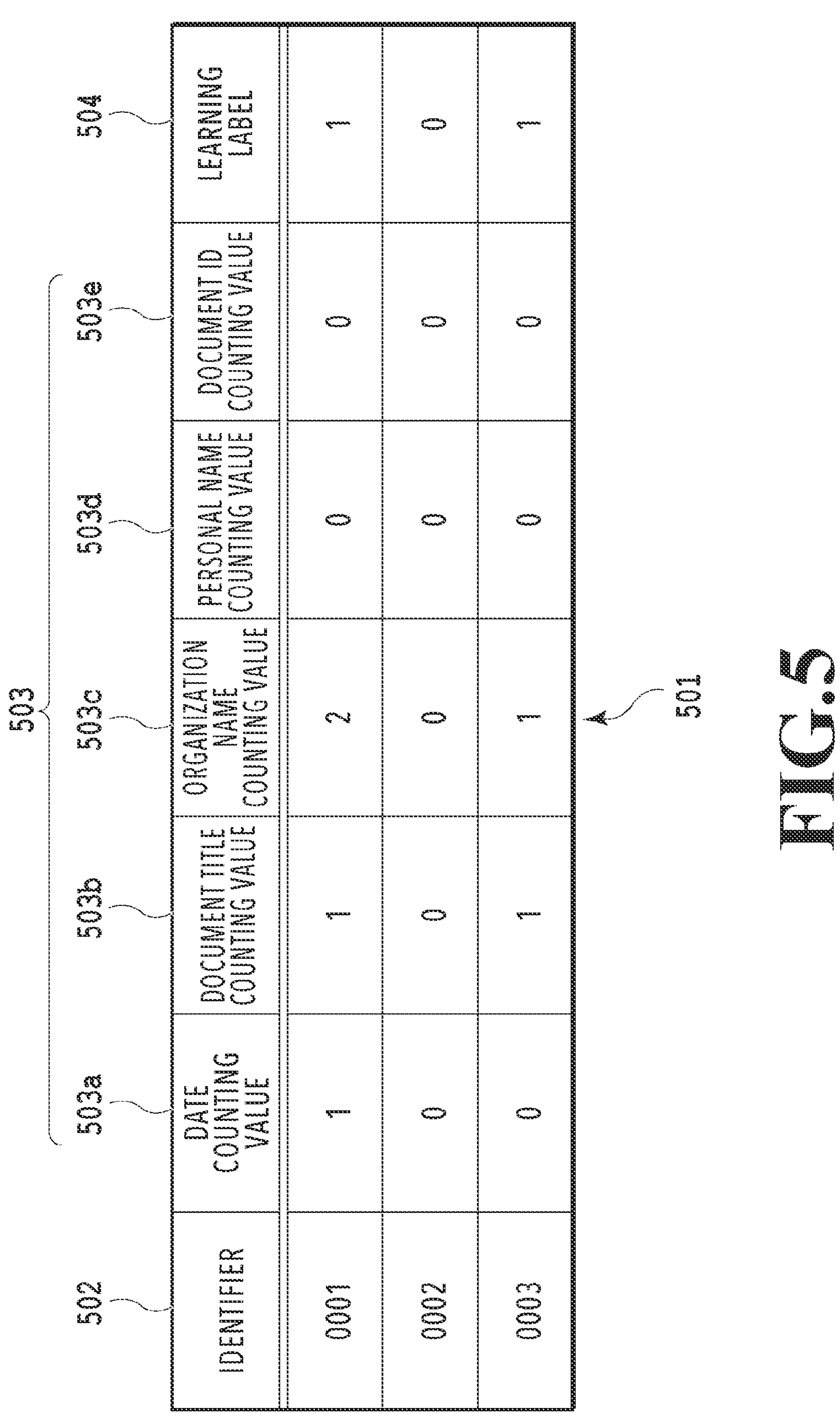
FIG. 5 is a diagram illustrating an example of learning data used in additional learning of a determination model according to Embodiment 1.

The additional learning of the determination model is described. FIG. 5 is a diagram illustrating an example of learning data 501 used in the additional learning of the determination model. The learning data 501 includes a characteristic amount vector 503 used as the explanatory variable in the additional learning of the determination model and a learning label 504 used as the training data in the additional learning. The characteristic amount vector 503 and the learning label 504 are managed in association with each other by an identifier 502. A date counting value 503*a* included in the characteristic amount vector 503 corresponds to the first (leftmost) component value in the characteristic amount vector generated by the block determination unit 207 (the vector generation unit). Likewise, a document title counting value 503*b*, an organization name counting value 503*c*, a personal name counting value 503*d*, and a document ID counting value 503*e* sequentially correspond to the second and subsequent component values in the characteristic amount vector. As a specific example, the characteristic amount vector 503 illustrated in FIG. 5 corresponds to the characteristic amount vectors 404*a*, 404*b*, and 404*c* illustrated in FIG. 4.

Each learning label 504 is labeled by, for example, the user determining in advance whether the input block is valid as the input block used to extract the named entity representing the characteristic of the document data, and 1 is labeled if it is valid, and 0 is labeled if it is invalid. The method of labeling the learning label 504 is not limited to that described above. For example, in a case where the named entity tag corresponding to the document title is estimated in one input block, the learning label 504 for this input block may be labeled as 1 to indicate that it is valid to be used to extract the named entity representing the characteristic of the document data. This is because the character string corresponding to the token provided with the named entity tag of the document title is the named entity representing the document type, and it is considered that the character string is valid as the named entity representing the characteristic of the document.

The learning unit 209 performs the additional supervised learning on the determination model by using the learning data 501 illustrated in FIG. 5 as an example. With the additional learning performed on the determination model, it is possible to further improve the accuracy of the determination on whether the input block is valid as the input block used to extract the named entity representing the characteristic of the document data. Note that, it is needless to say that the determination model can be generated by learning a learning model prepared in advance by using similar learning data as the learning data 501 illustrated in FIG. 5 as an example.

Modification of Embodiment 1

The information processing apparatus 100 according to Embodiment 1 generates the characteristic amount vector by using the estimation result of the named entity tag and determines whether the input block is valid as the input block used to extract the named entity representing the characteristic of the document data by using the generated characteristic amount vector. In contrast, an information processing apparatus according to a modification of Embodiment 1 (hereinafter, referred to as the "information processing apparatus of the modification") uses not only the characteristic amount vector but also information other than the characteristic amount vector related to each input block and improves the accuracy of the determination on whether the input block is valid as the input block used to extract the named entity representing the characteristic of the document data.

A configuration of the information processing apparatus of the modification is similar to the configuration of the information processing apparatus 100 according to Embodiment 1 illustrated in FIGS. 1 and 2 as an example; however, processing by the block determination unit 207 is different between the information processing apparatus of the modification and the information processing apparatus 100 according to Embodiment 1.

The block determination unit 207 included in the information processing apparatus of the modification (hereinafter, referred to as the "block determination unit 207 of the modification") includes a named entity obtainment unit and a layout obtainment unit, which are not illustrated in FIG. 2, in addition to the vector generation unit. The named entity obtainment unit obtains the named entity characteristic amount of the input block for each input block. Additionally, the layout obtainment unit obtains the layout characteristic amount of the input block for each input block. The named entity characteristic amount is information on the character string corresponding to the named entity existing in the input block that is quantified into a characteristic amount. For example, the named entity characteristic amount is a term frequency-inverse document frequency (TF-IDF). The TF-IDF is one of statistics scales representing "the importance in the document" of each of multiple words (the named entities) included in the document. Specifically, the TF-IDF can be calculated by multiplying a word frequency value representing "how frequently one word appears in one document" by an inverse document frequency value representing "how less frequently a document including one word exists out of all the documents".

The layout characteristic amount is a numerical value indicating what structure the named entity included in the input block is arranged. In a case where a position of a pixel of the document image is expressed by a planar coordinate system, the layout characteristic amount can be expressed by information indicating a region of each input block in the planar coordinate system, for example. Specifically, for example, in a case where the shape of each input block is rectangular, the layout characteristic amount is expressed by normalizing each of upper left x coordinate and y coordinate and lower right x coordinate and y coordinate of each input block in the planar coordinate system by using a width and a height of the document image.

The block determination unit 207 of the modification determines whether the input block is valid as the input block used to extract the named entity representing the characteristic of the document data by using the characteristic amount vector, the named entity characteristic amount, and the layout characteristic amount corresponding to the input block. Specifically, the block determination unit 207 of the modification inputs the characteristic amount vector, the named entity characteristic amount, and the layout characteristic amount to the determination model, for example. With the inputting, the block determination unit 207 of the modification determines whether the input block is valid as the input block used to extract the named entity representing the characteristic of the document data. The determination model used by the block determination unit 207 of the modification (hereinafter, referred to as "the determination model of the modification") is a learned model generated in advance by machine learning and the like, for example.

The determination model of the modification infers with binary whether the input block corresponding to the characteristic amount vector is valid as the input block used to extract the named entity representing the characteristic of the document data by using the characteristic amount vector, the named entity characteristic amount, and the layout characteristic amount as the explanatory variable. Specifically, the determination model of the modification is similar to the determination model used by the block determination unit 207 according to Embodiment 1 except the explanatory variable. That is, for example, the determination model of the modification can be implemented by learning by a machine learning algorithm of a decision tree model such as random forest in which the characteristic amount vector, the named entity characteristic amount, and the layout characteristic amount are inputted and the binary classification is outputted.

Comparing with the information processing apparatus 100 according to Embodiment 1, the information processing apparatus of the modification can further accurately determine whether the input block is valid as the input block used to extract the named entity representing the characteristic of the document data by using the determination model of the modification and. As a result, comparing with the information processing apparatus 100 according to Embodiment 1, the information processing apparatus of the modification can further accurately output the named entity representing the characteristic of the document data.

Figure 6:
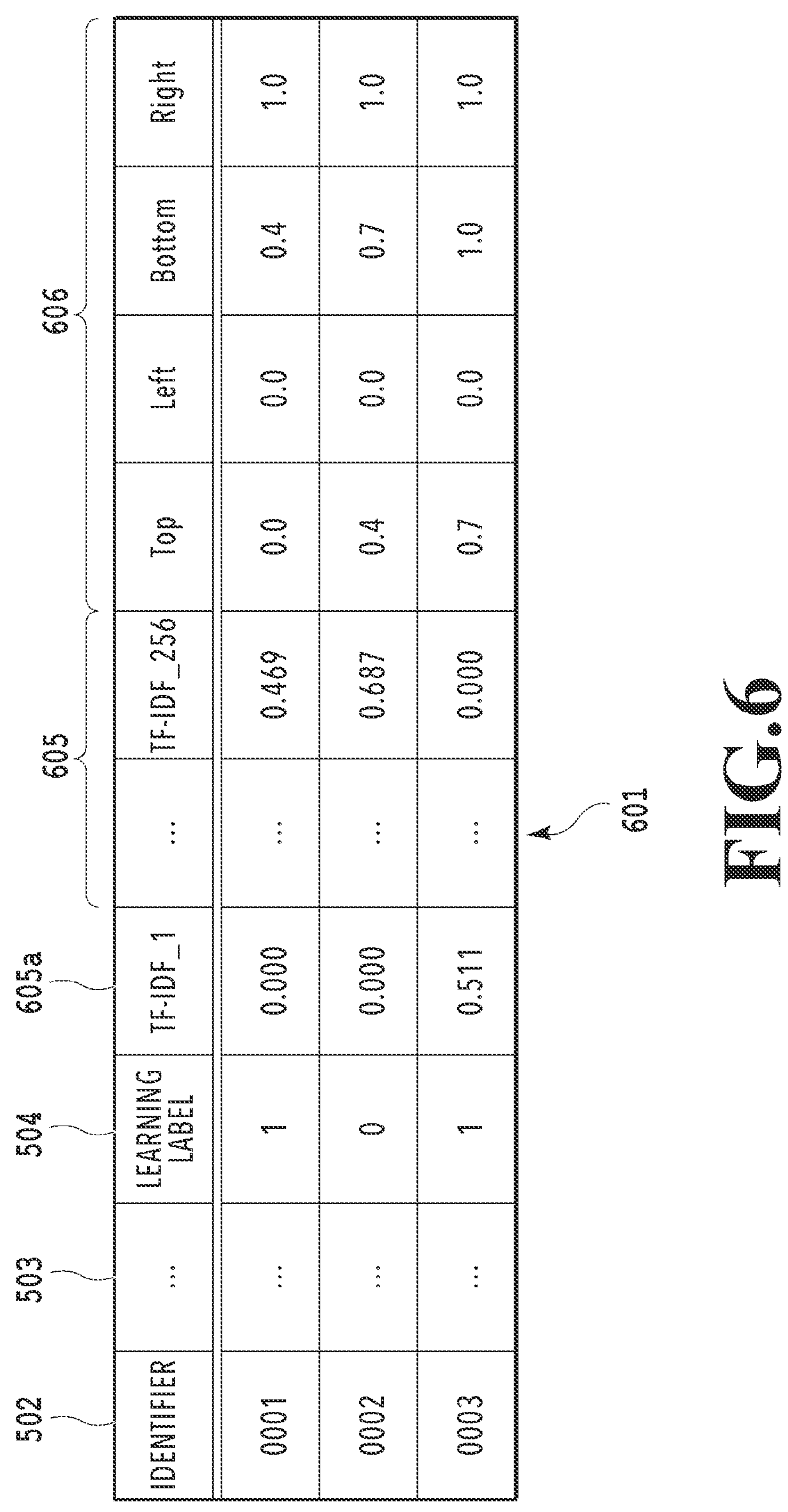
FIG. 6 is a diagram illustrating an example of learning data used in additional learning of the determination model according to a modification of Embodiment 1.

FIG. 6 is a diagram illustrating an example of learning data 601 used in additional learning of the determination model of the modification. The learning data 601 includes the characteristic amount vector 503, a named entity characteristic amount 605, and a layout characteristic amount 606 that are used as the explanatory variable in the additional learning of the determination model of the modification and the learning label 504 used as the training data in the additional learning. The characteristic amount vector 503, the named entity characteristic amount 605, the layout characteristic amount 606, and the learning label 504 are managed in association with each other by the identifier 502. The identifier 502, the characteristic amount vector 503, and the learning label 504 illustrated in FIG. 6 are similar to the identifier 502, the characteristic amount vector 503, and the learning label 504 illustrated in FIG. 5; for this reason, descriptions are omitted.

As an example, in the named entity characteristic amount 605 in FIG. 6, values of the TF-IDF corresponding to words in a case where the total number of the words included in the document is 256 are stored in TF-IDF 1 to TF-IDF 256. Hereinafter, as an example, description is given assuming that the document image has a width of 600 and a height of 1000. Additionally, assuming that the region of each of the input blocks 402*a*, 402*b*, and 402*c* illustrated in FIG. 4 is rectangular and the region of each of the input blocks 402*a*, 402*b*, and 402*c* is expressed by a four-dimensional component (Top, Left, Bottom, Right). Moreover, assuming that the regions of the input blocks 402*a*, 402*b*, and 402*c* are (0, 0, 400, 600), (400, 0,700, 600), and (700, 0, 1000, 600), respectively. The layout characteristic amount 606 in FIG. 6 stores a value obtained by normalizing Top and Bottom by the height of the document image and normalizing Left and Right by the width of the document image out of the four-dimensional component values indicating the regions of the input blocks 402*a*, 402*b*, and 402*c*.

The learning unit 209 included in the information processing apparatus of the modification performs the additional supervised learning on the determination model of the modification by using the learning data 601 illustrated as an example in FIG. 6. With the additional learning performed on the determination model of the modification, it is possible to further improve the accuracy of the determination on whether the input block is valid as the input block used to extract the named entity representing the characteristic of the document data. Note that, it is needless to say that the determination model of the modification can be generated by learning a learning model prepared in advance by using similar learning data as the learning data 601 illustrated as an example in FIG. 6.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to improve the accuracy of extracting a named entity representing a characteristic of a document.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-198728, filed Dec. 13, 2022 which is hereby incorporated by reference wherein in its entirety.

What is claimed is:

1. An information processing apparatus that extracts a named entity from document data by using a natural language processing model, comprising:
- one or more hardware processors; and
- one or more memories storing one or more programs configured to be executed by the one or more hardware processors, the one or more programs including instructions for:
- obtaining data of text from the document data;
- generating a token string by performing processing to break down the text into a token unit;
- generating a plurality of input blocks by dividing the token string into blocks in a unit that can be processed by the natural language processing model;
- estimating the named entity for each input block by inputting each of the plurality of input blocks to the natural language processing model;
- determining whether each of the plurality of input blocks is valid as the input block used to extract the named entity representing a characteristic of the document data based on a result from the estimation;
- outputting the named entity representing the characteristic of the document data based on the result from the estimation and a result from the determination; and
- generating a characteristic amount vector corresponding to each of the plurality of input blocks based on the result from the estimation, wherein
- based on the characteristic amount vector based on the result from the estimation, whether each of the plurality of input blocks is valid as the input block used to extract the named entity representing the characteristic of the document data is determined;
- the result from the estimation includes an estimation result of a named entity tag of the named entity corresponding to a token;
- based on the estimation result of the named entity tag, the characteristic amount vector corresponding to the input block is generated;
- based on the estimation result of the named entity tag, the characteristic amount vector based on the number of the named entity tags is generated; and
- whether each of the plurality of input blocks is valid as the input block used to extract the named entity representing the characteristic of the document data is determined by using a learned model obtained as a result of supervised learning, in which the characteristic amount vector is used as an explanatory variable, and information corresponding to the characteristic amount vector inputted to the learned model and indicating whether the extraction of the named entity is valid is used as training data.

2. The information processing apparatus according to claim 1, wherein the one or more programs further include an instruction for:
- performing additional learning on the learned model by inputting the characteristic amount vector to the learned model, wherein
- whether each of the plurality of input blocks is valid as the input block used to extract the named entity representing the characteristic of the document data is determined by using the learned model after the additional learning is performed.

3. The information processing apparatus according to claim 2, wherein
- the additional learning is performed on the learned model by supervised learning by using training data that corresponds to the characteristic amount vector inputted to the learned model and that indicates whether it is valid to extract the named entity.

4. The information processing apparatus according to claim 1, wherein
- the result from the estimation includes a score representing a plausibility of the named entity corresponding to a predetermined character string, and
- based on the score corresponding to one or more input blocks determined to be valid as the input block used to extract the named entity representing the characteristic of the document data, the named entity representing the characteristic of the document data is outputted.

5. The information processing apparatus according to claim 1, wherein
- the result from the estimation includes a score representing a plausibility of the named entity corresponding to a predetermined character string, and
- based on the score included in the result from the estimation, whether each of the plurality of input blocks is valid as the input block used to extract the named entity representing the characteristic of the document data is determined, and
- based on the score corresponding to one or more input blocks determined to be valid as the input block used to extract the named entity representing the characteristic of the document data, the named entity representing the characteristic of the document data is outputted.

6. The information processing apparatus according to claim 1, wherein the document data is data of a document image obtained by reading a document, and the data of the text included in the document image is obtained.

7. The information processing apparatus according to claim 6, wherein the one or more programs further include an instruction for:

obtaining a named entity characteristic amount, which is a characteristic amount of the named entity corresponding to a token included in the input block, and a layout characteristic amount, which is a characteristic amount indicating a position of the input block in the document image, wherein in addition to the result from the estimation, based on the named entity characteristic amount and the layout characteristic amount, whether each of the plurality of input blocks is valid as the input block used to extract the named entity representing the characteristic of the document data is determined.

8. The information processing apparatus according to claim 1, wherein the named entity representing the characteristic of the document data is the named entity representing a document type of the document data.

9. An information processing method to extract a named entity from document data by using a natural language processing model, comprising the steps of:

obtaining data of text from the document data;

generating a token string by performing processing to break down the text into a token unit;

generating a plurality of input blocks by dividing the token string into blocks in a unit that can be processed by the natural language processing model;

estimating the named entity for each input block by inputting each of the plurality of input blocks to the natural language processing model;

determining whether each of the plurality of input blocks is valid as the input block used to extract the named entity representing a characteristic of the document data based on a result from the estimation; and outputting the named entity representing the characteristic of the document data based on the result from the estimation and a result from the determination; and generating a characteristic amount vector corresponding to each of the plurality of input blocks based on the result from the estimation, wherein based on the characteristic amount vector based on the result from the estimation, whether each of the plurality of input blocks is valid as the input block used to extract the named entity representing the characteristic of the document data is determined;

the result from the estimation includes an estimation result of a named entity tag of the named entity corresponding to a token;

based on the estimation result of the named entity tag, the characteristic amount vector corresponding to the input block is generated;

based on the estimation result of the named entity tag, the characteristic amount vector based on the number of the named entity tags is generated; and whether each of the plurality of input blocks is valid as the input block used to extract the named entity representing the characteristic of the document data is determined by using a learned model obtained as a result of supervised learning, in which the characteristic amount vector is used as an explanatory variable, and information corresponding to the characteristic amount vector inputted to the learned model and indicating whether the extraction of the named entity is valid is used as training data.

10. A non-transitory computer readable storage medium storing a program for causing a computer to perform a control method of an information processing apparatus that extracts a named entity from document data by using a natural language processing model, the control method comprising the steps of:

obtaining data of text from the document data;

generating a token string by performing processing to break down the text into a token unit;

generating a plurality of input blocks by dividing the token string into blocks in a unit that can be processed by the natural language processing model;

estimating the named entity for each input block by inputting each of the plurality of input blocks to the natural language processing model;

determining whether each of the plurality of input blocks is valid as the input block used to extract the named entity representing a characteristic of the document data based on a result from the estimation; and outputting the named entity representing the characteristic of the document data based on the result from the estimation and a result from the determination; and generating a characteristic amount vector corresponding to each of the plurality of input blocks based on the result from the estimation, wherein based on the characteristic amount vector based on the result from the estimation, whether each of the plurality of input blocks is valid as the input block used to extract the named entity representing the characteristic of the document data is determined;

the result from the estimation includes an estimation result of a named entity tag of the named entity corresponding to a token;

based on the estimation result of the named entity tag, the characteristic amount vector corresponding to the input block is generated;

based on the estimation result of the named entity tag, the characteristic amount vector based on the number of the named entity tags is generated; and whether each of the plurality of input blocks is valid as the input block used to extract the named entity representing the characteristic of the document data is determined by using a learned model obtained as a result of supervised learning, in which the characteristic amount vector is used as an explanatory variable, and information corresponding to the characteristic amount vector inputted to the learned model and indicating whether the extraction of the named entity is valid is used as training data.

* * * * *